July 4, 1933.  B. V. E. NORDBERG  1,916,329

POWER PLANT

Filed June 20, 1931

Inventor

Bruno V. E. Nordberg

By Dodge and Sons

Attorneys

Patented July 4, 1933

1,916,329

UNITED STATES PATENT OFFICE

BRUNO V. E. NORDBERG, OF MILWAUKEE, WISCONSIN, ASSIGNOR TO NORDBERG MANUFACTURING COMPANY, OF MILWAUKEE, WISCONSIN, A CORPORATION OF WISCONSIN

POWER PLANT

Application filed June 20, 1931. Serial No. 545,812.

This invention relates to power plants, and particularly to means for cooling the generator in direct connected Diesel engines and electric generators. While the invention is particularly intended for Diesel-electric marine drive installations, it is generally applicable.

Heretofore generators in such units have been cooled by air circulated by a blower specially provided for that purpose. The present invention accomplishes the desired result without the provision of any special blower by connecting the suction of the scavenging air compressor used with any Diesel engine, with the generator housing, so that air flowing to the scavenging pump also cools the generator. In this way, a single pump is made to do double duty.

The Diesel engine may be of the two or four cycle type, and may have any type of fuel injection, for example, either air injection or solid injection. The scavenging pump may be of any type and may be driven in any preferred manner.

The invention will now be described by way of example as applied to a two cycle, four cylinder Diesel engine of the air injection type in which the scavenging pump is of the double acting reciprocating type and is constructed as a unit with the engine and its multi-stage injection air compressor.

In the drawing:—

Figure 1:
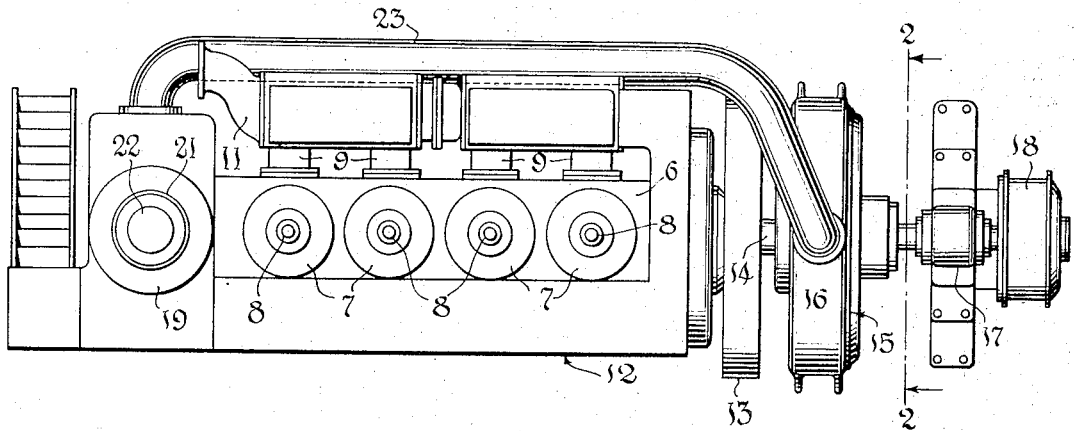
Fig. 1 is a plan view of such an engine, showing my invention applied.
Figure 2:
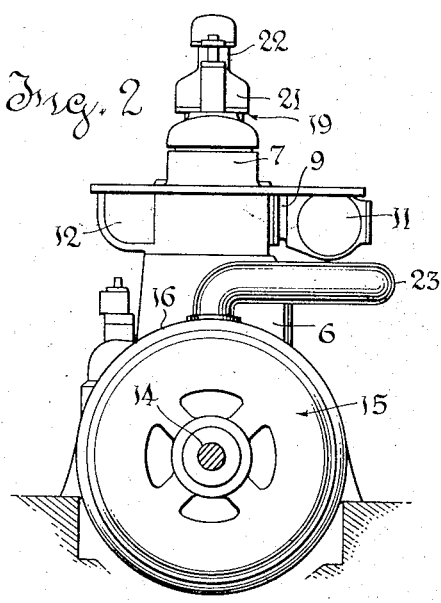
Fig. 2 is a vertical section on the line 2—2 of Fig. 1.

A portion of the engine frame appears at 6, and the four working cylinders at 7. These have the usual fuel injection valves 8. The exhaust passages 9 lead to the exhaust manifold 11, while the scavenging air manifold is shown at 12. There is the usual fly wheel 13 on the engine shaft 14.

A generator 15 is driven by shaft 14 and absorbs the power output of the engine. The generator includes the usual ventilating housing, a portion of which is shown at 16. There is an outboard bearing 17 and an exciter 18 for the generator, also driven by shaft 14.

The cylinder of the double acting scavenging pump appears at 19, the pump being driven from the engine crank shaft. Mounted above the scavenging cylinder 19, in steeple arrangement, are the cylinders 21, 22 of the familiar three-stage single acting compressor which furnishes the scavenging air. As usual, the pistons of this compressor are driven from the piston rod of the scavenging pump.

The scavenging pump compresses air and discharges it into the scavenging manifold 12. All the above-described parts may be arranged and operated according to the usual practice in the art, except that the air flowing to the scavenging pump is drawn through pipe 23 which is connected with the generator ventilating housing 16 and with the intake of the scavenging pump.

The quantity of air necessary to scavenge a Diesel engine only slightly exceeds that necessary to cool the generator, so that the arrangement is simple and entirely effective. The invention reduces both initial cost and maintenance of the plant as a whole, and entails no adverse operating characteristics.

Minor modifications to adapt this invention to specifically different scavenging pumps and generators are obviously within the scope of the invention.

What is claimed is:—

1. The combination of a generator having ventilating passages; a Diesel engine for driving the generator; a pump for furnishing scavenging air to said engine; and suction connections for passing said scavenging air through the ventilating passages of said generator and then to said pump.

2. The combination of a generator having ventilating passages; a Diesel engine for driving said generator; a displacement pump for furnishing scavenging air to said engine; and connections from the ventilating passages of said generator to the intake of said pump.

3. The combination of a generator having ventilating passages; a Diesel engine for driving said generator, said engine being substantially out of heat exchanging relation with said generator; a pump for furnishing scavenging air to said engine, said pump being constructed as a unit with said engine and being driven directly thereby; and connections from the ventilating passages of said generator to the intake of said pump.

In testimony whereof I have signed my name to this specification.

BRUNO V. E. NORDBERG.